United States Patent
Narayanan et al.

(10) Patent No.: US 11,347,884 B2
(45) Date of Patent: May 31, 2022

(54) DATA SECURITY TOOL

(71) Applicant: Bank of America Corporation, Charlotte, NC (US)

(72) Inventors: Rajesh Narayanan, Chennai (IN); Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 512 days.

(21) Appl. No.: 16/460,200

(22) Filed: Jul. 2, 2019

(65) Prior Publication Data
US 2021/0004478 A1   Jan. 7, 2021

(51) Int. Cl.
*G06F 21/62* (2013.01)
*G06F 3/06* (2006.01)

(52) U.S. Cl.
CPC .......... *G06F 21/6227* (2013.01); *G06F 3/064* (2013.01); *G06F 3/067* (2013.01); *G06F 3/0623* (2013.01); *G06F 21/6236* (2013.01)

(58) Field of Classification Search
CPC .... G06F 21/6227; G06F 3/0623; G06F 3/064; G06F 3/067; G06F 21/6236
See application file for complete search history.

(56) References Cited

U.S. PATENT DOCUMENTS

| | | |
|---|---|---|
| 6,715,116 B2 | 3/2004 | Lester |
| 7,017,107 B2 | 3/2006 | Talagala |
| 7,055,003 B2 | 5/2006 | Cargnoni |
| 7,062,704 B2 | 6/2006 | Talagala |
| 7,137,038 B2 | 11/2006 | New |
| 7,173,852 B2 | 2/2007 | Gorobets |
| 7,325,078 B2 | 1/2008 | Walker |
| 7,346,804 B2 | 3/2008 | Forrer, Jr. |
| 7,412,349 B2 | 8/2008 | Moser et al. |
| 7,477,547 B2 | 1/2009 | Lin |
| 7,496,823 B2 | 2/2009 | Wheeler |
| 7,526,686 B2 | 4/2009 | Kolvick, Jr. |
| 7,573,773 B2 | 8/2009 | Lin |
| 8,407,191 B1 | 3/2013 | Nanda |
| 8,667,333 B2 | 3/2014 | Hill |
| 8,687,421 B2 | 4/2014 | Avila |
| 8,688,700 B2 | 4/2014 | Fallen |
| 8,694,497 B2 | 4/2014 | Bacher et al. |
| 8,793,285 B2 | 7/2014 | Han |
| 8,825,744 B2 | 9/2014 | Wang et al. |
| 8,825,955 B2 | 9/2014 | Sleiman et al. |
| 8,832,162 B2 | 9/2014 | Greenspan et al. |

(Continued)

*Primary Examiner* — Theodore C Parsons
*Assistant Examiner* — Howard H. Louie

(57) ABSTRACT

An apparatus includes a memory that stores a plurality of records and a hardware processor. The processor receives a request for a first record and a second record of the plurality of records and divides, based on a type of the first record and a type of the second record, the first record into a first portion and a second portion and the second record into a third portion and a fourth portion. The processor also creates a first chunk using the first portion of the first record and the third portion of the second record and creates a second chunk using the second portion of the first record and the fourth portion of the second record. The processor further scrubs the first chunk to create a first message, scrubs the second chunk to create a second message, and communicates the first and second messages to an external device.

17 Claims, 3 Drawing Sheets

(56) References Cited

U.S. PATENT DOCUMENTS

| | | |
|---|---|---|
| 8,930,655 B2 | 1/2015 | Abzarian et al. |
| 9,170,879 B2 | 10/2015 | Yang |
| 9,171,620 B2 | 10/2015 | Avila |
| 9,208,182 B2 | 12/2015 | Kishi |
| 9,274,935 B1 | 3/2016 | Lachwani et al. |
| 9,356,966 B2 | 5/2016 | Patwardhan et al. |
| 9,436,400 B2 | 9/2016 | Abzarian et al. |
| 9,443,615 B2 | 9/2016 | Johnson et al. |
| 9,542,495 B2 | 1/2017 | Hanses et al. |
| 9,852,293 B2 | 5/2017 | Blount |
| 9,720,818 B2 | 8/2017 | Edmonds |
| 9,886,593 B2 | 2/2018 | Mushkatblat |
| 9,916,090 B1* | 3/2018 | Can .................. G06F 3/0685 |
| 10,013,339 B2 | 7/2018 | Athinathan |
| 10,026,483 B1 | 7/2018 | Shah |
| 2008/0155314 A1 | 2/2008 | Forrer, Jr. |
| 2011/0289386 A1 | 11/2011 | Yang |
| 2014/0280367 A1 | 9/2014 | Bloching et al. |
| 2014/0379921 A1 | 12/2014 | Morley et al. |
| 2015/0012757 A1* | 1/2015 | Binder .................. G06F 7/58 |
| | | 713/190 |
| 2015/0286435 A1* | 10/2015 | Hwang ............ G06F 11/1456 |
| | | 711/162 |
| 2016/0098574 A1 | 4/2016 | Bargagni |
| 2017/0364705 A1* | 12/2017 | Villars ................ G06Q 10/10 |
| 2018/0190365 A1* | 7/2018 | Luck .................... G11C 29/52 |
| 2019/0004894 A1* | 1/2019 | Chagam Reddy .. G06F 11/1076 |

\* cited by examiner

DATA SECURITY TOOL

TECHNICAL FIELD

This disclosure relates generally to data security.

BACKGROUND

Online and digital transactions frequently involve the communication of personal information over networks.

SUMMARY OF THE DISCLOSURE

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. These malicious users may then use the personal information to impersonate other users or sell the personal information to other malicious actors.

Data that includes personal information may be stored in a central repository and transmitted to servers and devices as needed. One conventional way to protect personal information from malicious actors is to first send the data to a server that scrubs the data. Scrubbing involves removing personal information from the data so that, in theory, even if the data were compromised by a malicious actor, the personal information would not be compromised. However, once data leaves the central repository (e.g., to go to a server for scrubbing), the safety and integrity of that data can no longer be guaranteed. For example, the data may be intercepted during transport or the data may be copied and reside on an intermediate device in the transport chain, which can later be compromised by a malicious actor. Additionally, even though data is sent to a server for scrubbing, the data may not be perfectly scrubbed. In other words, if this scrubbed data were compromised by a malicious actor, some personal information may still be exposed.

This disclosure contemplates a data security tool that improves the security of information (e.g., personal information) by implementing an unconventional scrubbing process at the repository. The data security tool divides requested data records into portions and then combines portions of separate data records to form chunks. In essence, the data records are shredded and then combined with other shredded data records to form chunks. These chunks are then scrubbed and communicated out of the repository (e.g., to the requesting device). By scrubbing data at the repository, the security of the data is improved because personal information is removed before the data even leaves the repository. Additionally, by shredding data records and combining with other shredded records, the security of the personal information in each record is improved because even if a chunk with personal information were intercepted or compromised by a malicious actor, the malicious actor may not be able to use or understand that personal information without also obtaining and deciphering the other chunks. Certain embodiments of the data security tool are described below.

According to an embodiment, an apparatus includes a memory and a hardware processor. The memory stores a plurality of records. The processor receives, from an external device, a first request for a first record and a second record of the plurality of records and divides, based on a type of the first record and a type of the second record, the first record into a first portion and a second portion and the second record into a third portion and a fourth portion. The processor also creates a first chunk using the first portion of the first record and the third portion of the second record and creates a second chunk using the second portion of the first record and the fourth portion of the second record. The processor further scrubs the first chunk to create a first message, scrubs the second chunk to create a second message, and communicates the first and second messages to the external device.

According to another embodiment, a method includes storing, by a memory, a plurality of records and receiving, by a hardware processor communicatively coupled to the memory, from an external device, a first request for a first record and a second record of the plurality of records. The method also includes dividing, by the hardware processor, based on a type of the first record and a type of the second record, the first record into a first portion and a second portion and the second record into a third portion and a fourth portion, creating, by the hardware processor, a first chunk using the first portion of the first record and the third portion of the second record, and creating, by the hardware processor, a second chunk using the second portion of the first record and the fourth portion of the second record. The method further includes scrubbing, by the hardware processor, the first chunk to create a first message, scrubbing, by the hardware processor, the second chunk to create a second message, and communicating the first and second messages to the external device.

According to yet another embodiment, a system includes a device and a data security tool. The data security tool stores a plurality of records and receives, from the device, a first request for a first record and a second record of the plurality of records. The data security tool divides, based on a type of the first record and a type of the second record, the first record into a first portion and a second portion and the second record into a third portion and a fourth portion, creates a first chunk using the first portion of the first record and the third portion of the second record, and creates a second chunk using the second portion of the first record and the fourth portion of the second record. The data security tool scrubs the first chunk to create a first message, scrubs the second chunk to create a second message, and communicates the first and second messages to the device.

Certain embodiments provide one or more technical advantages. For example, an embodiment improves data security by scrubbing data before the data leaves a repository. As another example, an embodiment improves data security by dividing data into chunks and scrubbing chunks individually. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
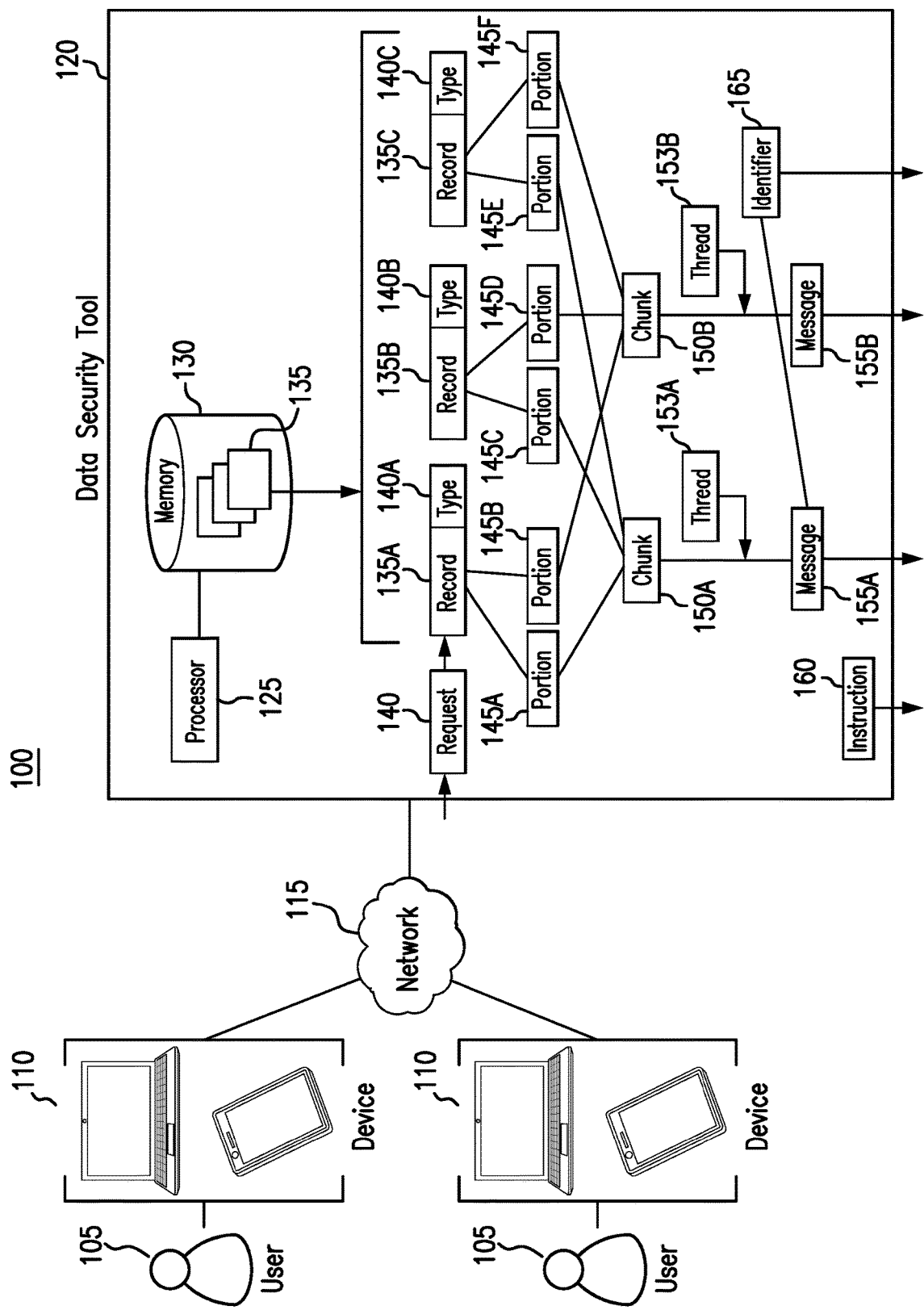
FIG. 1 illustrates an example system.
Figure 2:
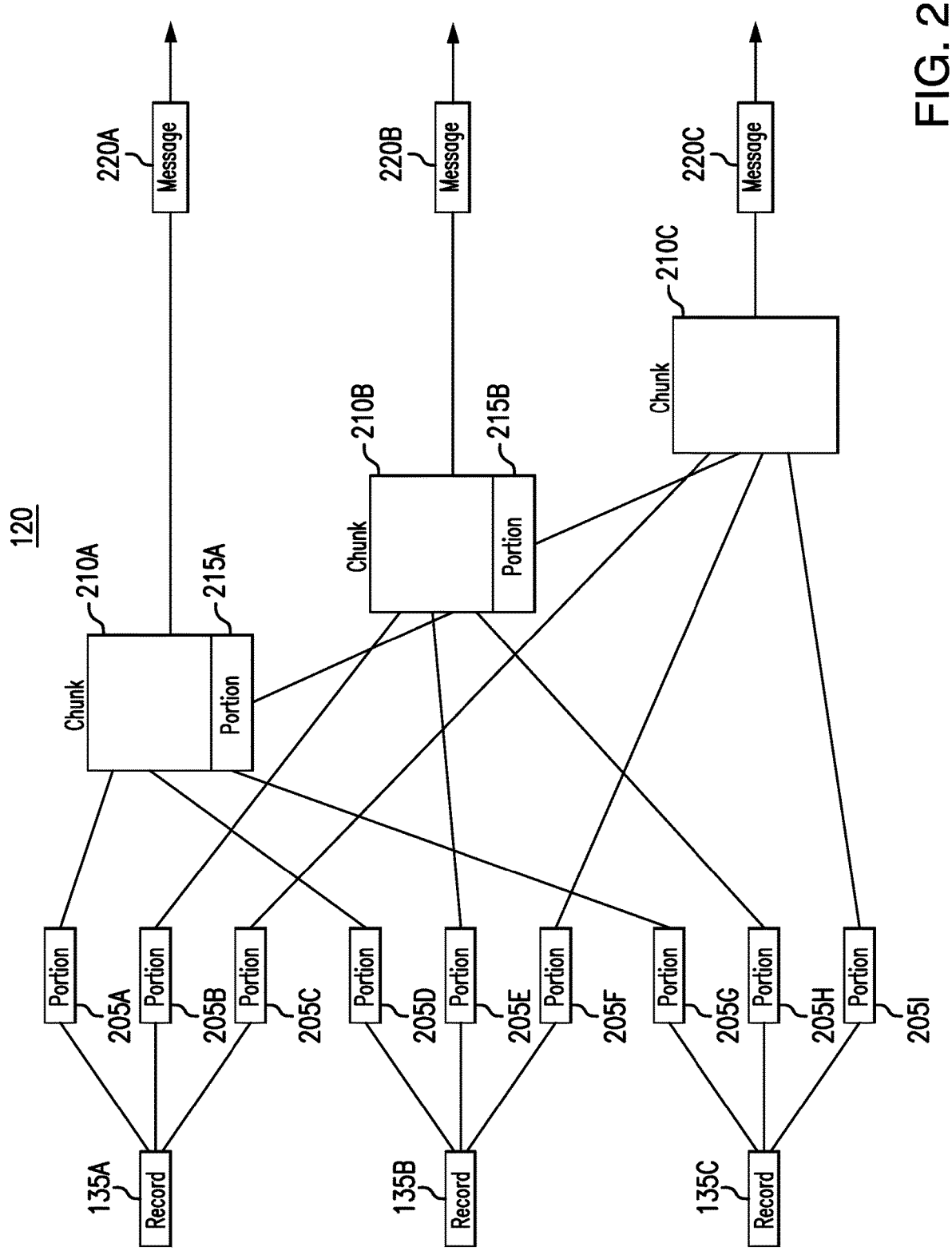
FIG. 2 illustrates an example data security tool of the system of FIG. 1.
Figure 3:
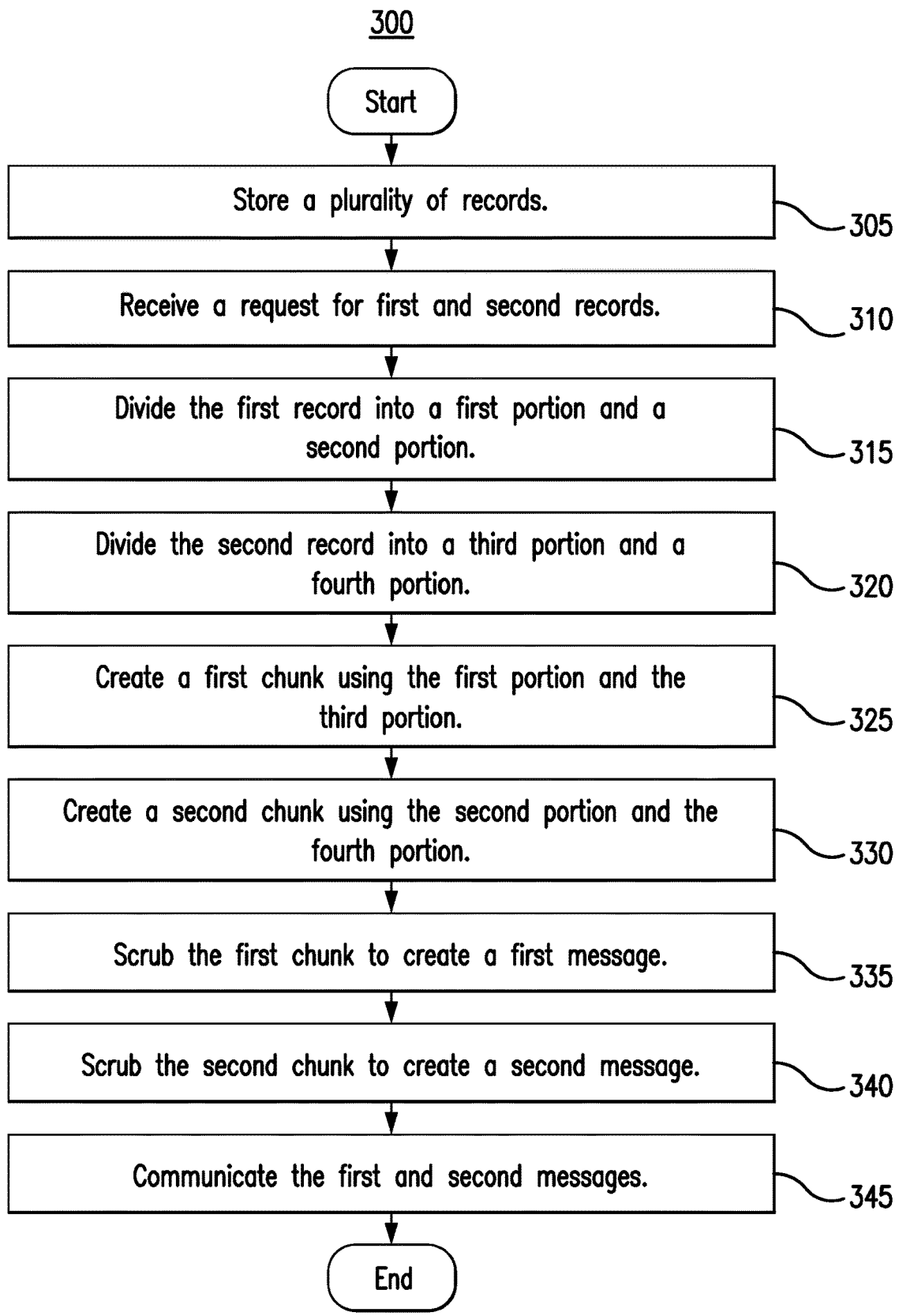
FIG. 3 is a flowchart illustrating a method for improving data security using the system of FIG. 1.

Embodiments of the present disclosure and its advantages are best understood by referring to FIGS. 1 through 3 of the drawings, like numerals being used for like and corresponding parts of the various drawings.

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. These malicious users may then use the personal information to impersonate other users or sell the personal information to other malicious actors.

Data that includes personal information may be stored in a central repository and transmitted to servers and devices as needed. One conventional way to protect personal information from malicious actors is to first send the data to a server that scrubs the data. Scrubbing involves removing personal information from the data so that, in theory, even if the data were compromised by a malicious actor, the personal information would not be compromised. However, once data leaves the central repository (e.g., to go to a server for scrubbing), the safety and integrity of that data can no longer be guaranteed. For example, the data may be intercepted during transport or the data may be copied by and reside on an intermediate device in the transport chain, which can later be compromised by a malicious actor. Additionally, even though data is sent to a server for scrubbing, the data may not be perfectly scrubbed. In other words, if this scrubbed data were compromised by a malicious actor, some personal information may still be exposed.

This disclosure contemplates a data security tool that improves the security of information (e.g., personal information) by implementing an unconventional scrubbing process at the repository. The data security tool divides requested data records into portions and then combines portions of separate data records to form chunks. In essence, the data records are shredded and then combined with other shredded data records to form chunks. These chunks are then scrubbed and communicated out of the repository (e.g., to the requesting device). By scrubbing data at the repository, the security of the data is improved because personal information is removed before the data even leaves the repository. Additionally, by shredding data records and combining with other shredded records, the security of the personal information in each record is improved because even if a chunk with personal information were intercepted or compromised by a malicious actor, the malicious actor may not be able to use or understand that personal information without also obtaining and deciphering the other chunks. The system and the data security tool will be described in more detail using FIGS. 1 through 3.

FIG. 1 illustrates an example system 100. As seen in FIG. 1, system 100 includes one or more devices 110, a network 115, and a data security tool 120. Generally, system 100 stores and maintains data records for users 105. These data records may include personal information of user 105. To protect this personal information, system 100 may divide requested records into portions. System 100 then combines portions of different data records to form chunks. System 100 then scrubs these chunks to remove personal information. The scrubbed chunks are then communicated to a requesting user 105. In this manner, the security of personal information is improved because the requested data records are scrubbed before they are communicated. Additionally, the security of the personal information is improved because the chunks are formed with portions of different data records. Even if one chunk is compromised or intercepted, the information within that chunk may be unusable unless all the other chunks are also compromised.

Device 110 is used to communicate with other components of system 100. For example, device 110 may be used by a user 105 to request data records from data security tool 120. Device 110 may receive scrubbed data records from data security tool 120. Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Generally, data security tool 120 divides requested data records into portions and then combines portions of different data records into chunks. Data security tool 120 then scrubs these chunks and communicates the chunks to a requesting device 110. In this manner, the security of personal information within these data records is improved in certain embodiments. Data security tool 120 includes a processor 125 and a memory 130. This disclosure contemplates processor 125 and memory 130 being configured to perform any of the functions of data security tool 120 described herein.

Processor 125 is any electronic circuitry, including, but not limited to microprocessors, application specific integrated circuits (ASIC), application specific instruction set processor (ASIP), and/or state machines, that communicatively couples to memory 130 and controls the operation of data security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware that operates software to control and process information. Processor 125 executes software stored on memory to perform any of the functions described herein. Processor 125 controls the operation and administration of data security tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Data security tool 120 stores data records 135. In this manner, data security tool 120 functions as a repository that stores data records 135. Data records 135 may include personal information of a user 105. This personal information may identify user 105 and may be used to impersonate user 105 if the personal information is compromised. As a result, the security of the personal information is important. To improve the security of the personal information, data security tool 120 scrubs these data records 135 in an unconventional manner before communicating these data records 135 to a requesting user 105 or device 110.

Data security tool 120 receives a request 140 from a device 110. Device 110 may be external to data security tool 120 and may have communicated request 140 through network 115. Request 140 identifies one or more data records 135 to be communicated to device 110. In the example of FIG. 1, request 140 requested three records, shown as record 135A, record 135B, and record 135C. In response to receiving request 140, data security tool 120 retrieves the requested data records 135 from memory 130 and prepares these data records 135 for transmission to a requesting user 105 or device 110.

Each data record 135 is of a certain type 140. In the example of FIG. 1, record 135A is of a type 140A. Record 135B is of a type 140B. Record 135C is of a type 140C. This disclosure contemplates type 140 indicating any property of data record 135. For example, type 140 may indicate a format of data record 135 such as JSON, XML, CSV, or flat text. Data security tool 120 may process a data record 135 based on the data record's type 140. For example, data security tool 120 may partition a data record 135 differently depending on the type 140 of the data record 135. Data security tool 120 may look for different syntax or keyword elements within data record 120 when dividing data record 1345.

Data security tool 120 divides each retrieved record 135 into portions 145. In some embodiments, data security tool 120 divides a record 135 into portions 145 based on type 140. In the example of FIG. 1, data security tool 120 divides record 135A into portion 145A and portion 145B. Data security tool 120 divides record 135B into portion 145C and portion 145D. Data security tool 120 divides record 135C into portion 145E and portion 145F.

Data security tool 120 then combines portions 145 of different data records 135 to form chunks 150. In this manner, each chunk 150 may include portions 145 of different records 135. As a result, if one chunk is compromised, the information within that chunk may be unusable or of limited value if the other chunks 150 are not compromised. In the example of FIG. 1, data security tool 120 combines portions 145A, 145C, and 145E to form chunk 150A. Data security tool 120 combines portions 145B, 145D and 145F to form chunk 150B.

In particular embodiments, data security tool 120 may determine the number of chunks 150 and/or which portions 145 of which data records 135 should form a chunk 150 based on the sizes of the requested data records 135. In the example of FIG. 1, data security tool 120 may determine to form chunk 150A using portions 145A, 145C, and 145E based on the sizes of data records 135A, 135B, and 135C.

Data security tool 120 then scrubs the chunks 150 to form messages 155. By scrubbing a chunk 150, data security tool 120 removes personal information from the chunk 150. As a result, message 155 may exclude personal information of user 105. Thus, if message 155 is compromised during transit, the personal information of user 105 is not compromised. This disclosure contemplates data security tool 120 using any suitable scrubbing process to scrub chunk 150. In the example of FIG. 1, data security tool 120 scrubs chunk 150A to form message 155A. Data security tool 120 scrubs chunk 150B to form message 155B.

In certain embodiments, data security tool 120 scrubs different chunks 150 using different threads 153. By using different threads 153 to scrub different chunks 150, data security 120 can scrub different chunks 150 in parallel with one another. In the example of FIG. 1, data security tool 120 scrubs chunk 150A using thread 153A and chunk 150B using thread 153B. Chunks 150A and 150B may thus be scrubbed in parallel. Thus, by using threads 153 to scrub different chunks 150, data security tool 120 improves the speed at which a number of chunks 150 are scrubbed.

Data security tool 120 communicates messages 155 to a requesting user 105 or device 110. A message 155 may include information from a requested data record 135, but not the personal information within the data record 135. Thus, if message 155 is compromised during transit, the personal information of user 105 is not also compromised.

In certain embodiments, data security tool 120 generates instruction 160 and communicates instruction 160 to a requesting user 105 or device 110. Instruction 160 includes instructions on how to reassemble received messages 155 to form the requested data records 135. By using instruction 160, device 110 can reconstruct requested data records 135 from received messages 155. In the illustrated example of FIG. 1, device 110 can use instruction 160 to construct data records 135A, 135B, and 135C from messages 155A and 155B.

In some embodiments, data security tool 120 generates an identifier 165. Data security tool 120 assigns identifier 165 to the messages 155 generated from requested data records 135. In the example of FIG. 1, identifier 165 is assigned to messages 155A and 155B. Data security tool 120 communicates identifier 165 to a requesting user 105 or device 110. To identify certain messages 155 as corresponding to the same data records 135. In the example of FIG. 1, identifier 165 indicates that message 155A and message 155B both correspond to data records 135A, 135B, and 135C.

By diving records 135 into portions 145, combining portions 145 of different records 135 to form chunks 150, and scrubbing chunks 150 before communicating messages 155 to a requesting user 105 or device 110, data security tool 120 improves the security of personal information within data records 135. For example, if a message 155 were compromised during transit, the personal information within the data record 135 may not be compromised because the information was scrubbed out and even if the information were not scrubbed out, the personal information within the compromised message 155 may be unusable unless the malicious actor also compromised other messages 155 that corresponded to the requested data records 135.

FIG. 2 illustrates an example data security tool 120 of the system 100 of FIG. 1. Generally, FIG. 2 shows an example operation of data security tool 120 in which chunks are scrubbed serially. By scrubbing chunks serially, the security of personal information within data records 135 is further improved.

Data security tool 120 divides data records 135 into portions 205. In the example of FIG. 2, data security tool 120 divides data record 135A into portions 205A, 205B, and 205C. Data security tool 120 divides data record 135B into portions 205D, 205E, and 205F. Data security tool 120 divides data record 135C into portions 205G, 205H, and 205I. Data security tool 120 may divide these data records 135 into portions 205 in a similar manner as shown and described for FIG. 1.

Data security tool 120 combines different portions 205 from different data records 135 to form chunks 210. Additionally, each chunk 210 may also be formed using a portion 215 of a previous chunk 210. In the example of FIG. 2, data security tool 120 forms chunk 210A using portions 205A, 205D, and 205G. Chunk 210A includes a portion 215A. Data security tool 120 forms chunk 210B using portion 215A and portions 205B, 205E, and 205H. Chunk 210B includes a portion 215B. Data security tool 120 forms chunk 210C using portion 215B and portions 205C, 205F, and 205I.

Data security tool 120 then scrubs chunks 210A, 210B, and 210C to form messages 220A, 220B, and 220C. In this manner, messages 220 may include portions 215 of chunks 210 that were not scrubbed to form the message 220. For example, message 220B may include a scrubbed portion 215A from chunk 210A even though chunk 210B was scrubbed to form message 220B. Data security tool 120 communicates messages 220A, 220B, and 220C to a requesting device or user. In certain embodiments, by including portions 215 of a chunk 210 in another chunk 210, the link between the chunks 210 is strengthened, thus improving the security of the personal information in the data records 135.

FIG. 3 is a flow chart illustrating a method 300 for improving data security using the system 100 of FIG. 1. In particular embodiments, data security tool 120 performed the steps of method 300. By performing method 300, data security tool 120 improves the security of personal information within requested data records.

Data security tool 120 begins by storing a plurality of records in step 305. These records may contain personal information of a user. In step 310, data security tool 120 receives a request for first and second records. Data security tool 120 retrieves these records in response to the request. In step 315, data security tool 120 divides the first record into a first portion and a second portion. In step 320, data security tool 120 divides the second record into a third portion and a fourth portion.

Data security tool 120 creates a first chunk using the first portion and the third portion in step 325. In step 330, data security tool 120 creates a second chunk using the second portion and the fourth portion. Data security tool 120 scrubs the first chunk to create a first message in step 335. In step 340, data security tool 120 scrubs the second chunk to create a second message. Data security toll 120 communicates the first and second messages in step 345. In certain embodiments, the first and second messages may be communicated to an external device.

Modifications, additions, or omissions may be made to method 300 depicted in FIG. 3. Method 300 may include more, fewer, or other steps. For example, steps may be performed in parallel or in any suitable order. While discussed as data security tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of records; and
a hardware processor communicatively coupled to the memory, the hardware processor configured to:
receive, from an external device, a first request for a first record and a second record of the plurality of records;
divide, based on a type of the first record and a type of the second record, the first record into a first portion and a second portion and the second record into a third portion and a fourth portion;
create a first chunk using the first portion of the first record and the third portion of the second record;
create a second chunk using the second portion of the first record and the fourth portion of the second record;
scrub the first chunk to create a first message;
scrub the second chunk to create a second message;
communicate the first and second messages to the external device;
divide the first record into the first portion, the second portion, and a fifth portion;
divide the second record into the third portion, the fourth portion, and a sixth portion;
create a third chunk using the fifth portion of the first record and the sixth portion of the second record;
scrub the first chunk to create a third message;
scrub the second chunk and a portion of the third message to create a fourth message;
scrub the third chunk and a portion of the fourth message to create a fifth message; and
communicate the third, fourth, and fifth messages to the external device.

2. The apparatus of claim 1, wherein the hardware processor is further configured to communicate, to the external device, an instruction that indicates how to reassemble the first and second records from the first and second messages.

3. The apparatus of claim 1, wherein the hardware processor is further configured to determine that the first portion of the first record and the third portion of the second record should be used to create the first chunk based on a size of the first record and a size of the second record.

4. The apparatus of claim 1, wherein the hardware processor is further configured to:
use a first thread to scrub the first chunk; and
use a second thread, separate from the first thread, to scrub the second chunk.

5. The apparatus of claim 4, wherein the hardware processor is further configured to scrub the first chunk in parallel with scrubbing the second chunk.

6. The apparatus of claim 1, wherein the hardware processor is further configured to:
assign an identifier to the first message;
assign the identifier to the second message; and
communicate the identifier to the external device.

7. A method comprising:
storing, by a memory, a plurality of records;
receiving, by a hardware processor communicatively coupled to the memory, from an external device, a first request for a first record and a second record of the plurality of records;
dividing, by the hardware processor, based on a type of the first record and a type of the second record, the first record into a first portion and a second portion and the second record into a third portion and a fourth portion;
creating, by the hardware processor, a first chunk using the first portion of the first record and the third portion of the second record;
creating, by the hardware processor, a second chunk using the second portion of the first record and the fourth portion of the second record;
scrubbing, by the hardware processor, the first chunk to create a first message;
scrubbing, by the hardware processor, the second chunk to create a second message;
communicating the first and second messages to the external device;
dividing, by the hardware processor, the first record into the first portion, the second portion, and a fifth portion;
dividing, by the hardware processor, the second record into the third portion, the fourth portion, and a sixth portion;
creating, by the hardware processor, a third chunk using the fifth portion of the first record and the sixth portion of the second record;
scrubbing, by the hardware processor, the first chunk to create a third message;
scrubbing, by the hardware processor, the second chunk and a portion of the third message to create a fourth message;
scrubbing, by the hardware processor, the third chunk and a portion of the fourth message to create a fifth message; and
communicating the third, fourth, and fifth messages to the external device.

8. The method of claim 7, further comprising communicating, by the hardware processor, to the external device, an instruction that indicates how to reassemble the first and second records from the first and second messages.

9. The method of claim 7, further comprising determining, by the hardware processor, that the first portion of the first record and the third portion of the second record should be used to create the first chunk based on a size of the first record and a size of the second record.

10. The method of claim 7, further comprising:
using, by the hardware processor, a first thread to scrub the first chunk; and
using, by the hardware processor, a second thread, separate from the first thread, to scrub the second chunk.

11. The method of claim 10, further comprising scrubbing, by the hardware processor, the first chunk in parallel with scrubbing the second chunk.

12. The method of claim 7, further comprising:
assigning, by the hardware processor, an identifier to the first message;
assigning, by the hardware processor, the identifier to the second message; and
communicating the identifier to the external device.

13. A system comprising:
a device; and
a data security tool configured to:
store a plurality of records;
receive, from the device, a first request for a first record and a second record of the plurality of records;
divide, based on a type of the first record and a type of the second record, the first record into a first portion and a second portion and the second record into a third portion and a fourth portion;
create a first chunk using the first portion of the first record and the third portion of the second record;
create a second chunk using the second portion of the first record and the fourth portion of the second record;
scrub the first chunk to create a first message;
scrub the second chunk to create a second message;
communicate the first and second messages to the device;
divide the first record into the first portion, the second portion, and a fifth portion;
divide the second record into the third portion, the fourth portion, and a sixth portion;
create a third chunk using the fifth portion of the first record and the sixth portion of the second record;
scrub the first chunk to create a third message;
scrub the second chunk and a portion of the third message to create a fourth message;
scrub the third chunk and a portion of the fourth message to create a fifth message; and
communicate the third, fourth, and fifth messages to the device.

14. The system of claim 13, wherein the data security tool is further configured to communicate, to the device, an instruction that indicates how to reassemble the first and second records from the first and second messages.

15. The system of claim 13, wherein the data security tool is further configured to determine that the first portion of the first record and the third portion of the second record should be used to create the first chunk based on a size of the first record and a size of the second record.

16. The system of claim 13, wherein the data security tool is further configured to:
use a first thread to scrub the first chunk; and
use a second thread, separate from the first thread, to scrub the second chunk.

17. The system of claim 13, wherein the data security tool is further configured to:
assign an identifier to the first message;
assign the identifier to the second message; and
communicate the identifier to the device.

* * * * *